United States Patent Office 3,464,985
Patented Sept. 2, 1969

3,464,985
7 - [D - α - AMINO - (ACETAMIDOPHENYLACETA-MIDO)]-CEPHALOSPORANIC ACIDS AND DERIVATIVES THEREOF
Charles Truman Holdrege, Camillus, N.Y., assignor to Bristol-Myers Company, New York, N.Y., a corporation of Delaware
No Drawing. Filed Aug. 18, 1967, Ser. No. 661,520
Int. Cl. C07d 99/24; A61k 21/00
U.S. Cl. 260—243        8 Claims

ABSTRACT OF THE DISCLOSURE

7 - [D - α - amino - (acetamidophenylacetamido)]-cephalosporanic acids and 7-[2,2-dimethyl - 5 - oxo - 4-acetamidophenyl - 1 - imidazolidinyl] - 3 - acetoxymethyl - 8 - oxo - 5 - thia-1-azabicyclo-[4·2·0]oct-2-ene-2-oic acids and the pharmaceutically acceptable nontoxic salts thereof are useful as antibacterial agents in animals, including man. An example of the process for their preparation is the treatment of D-α-t-butoxycarboxamido-4-acetamidophenylacetic acid with trichloroacetyl chloride to produce the mixed anhydride which in turn is treated with 7-aminocephalosporanic acid to produce 7-[D-α-amino - (4' - acetamidophenylacetamido)] - cephalosporanic acid, said compound being further treated with acetone to produce 7-[2,2-dimethyl-5-oxo-4-(4'-acetamidophenyl) - 1 - imidazolidinyl) - 3 - acetoxymethyl - 8 - oxo - 5 - thia - 1 - azabicyclo - [4·2·0]oct-2-ene-2-oic acid.

BACKGROUND OF THE INVENTION

Field of the invention

The compounds of the present invention are useful in the treatment of bacterial infections in animals, including man.

Description of the prior art

Cephalosporanic acid derivatives are known in the art to be useful as antibacterial agents. The compounds of the present invention, which are characterized by acetamido substitution of the phenyl ring, were heretofore unknown or taught by the prior art.

SUMMARY OF THE INVENTION

The compounds of the present invention are characterized as having the formulas

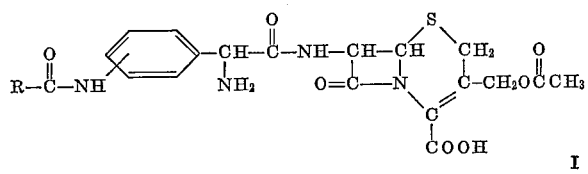

and

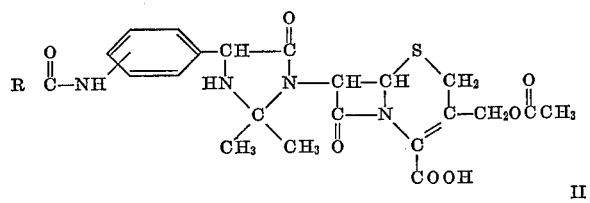

wherein R is (lower) alkyl; and the pharmaceutically acceptable, nontoxic salts thereof.

The disclosure includes the process for the preparation of the compounds of the present invention.

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and gram-negative bacteria and, more particularly, relates to acids characterized as having the structural formulas

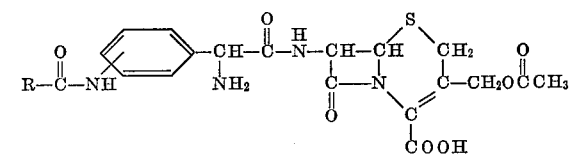

or

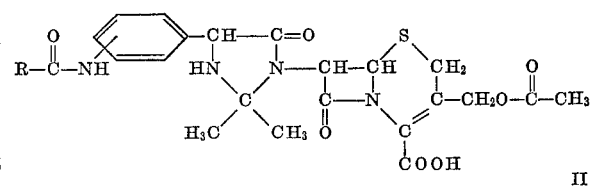

wherein R is (lower) alkyl; and including the pharmaceutically acceptable salts thereof.

The term "(lower) alkyl" as used herein means both straight and branched chain saturated aliphatic hydrocarbon radicals having from 1 to 10 carbon atoms such as methyl, ethyl, propyl, isopropyl, butyl, isobutyl, t-butyl, amyl and hexyl.

It was the object of the present invention to prepare novel cephalosporin derivatives that would preferably be stable in aqueous solution and yet also be nontoxic and exhibit oral absorption and high antibacterial activity against both gram-positive and gram-negative bacteria.

The object of the present invention has been achieved by the provision, according to the present invention, of the compounds of the Formulas I and II and the pharmaceutically acceptable salts thereof.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri(lower)alkylamines, procaine, dibenzylamine, N-benzyl-beta-phenethylamine, 1 - ephenamine, N,N'-dibenzylethylenediamine, dehydroabietylamine, N,N'-bis-dehydroabietylethylenediamine, N - (lower)alkylpiperidines, such as N-ethylpiperidine and other amines which have been used to form salts of benzylpenicillin; and (2) nontoxic pharmaceutically acceptable acid addition salts (i.e. salts of the baisc nitrogen) such as (a) the mineral acid addition salts such as hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolyzed esters or amides of such acids which may be converted to the free acid form by chemical or enzymatic hydrolysis.

The carbon bearing the free amino group of the compounds of Formula I is an asymmetric carbon atom and thus the compounds of Formula I and Formula II can exist in two optically active isomeric forms (the D- and L-diasteroisomers), as well as in a mixture of the two optically active forms, all of which are included in the present invention.

The compounds of the present invention are prepared by a novel three step process:

(1) A mixed anhydride having the formula

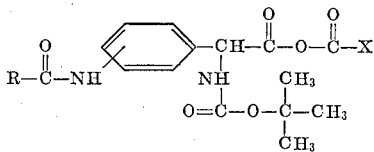

III or its functional equivalent as an acylating agent for a primary amine, wherein R is (lower)alkyl and X is —CCl$_3$ or —O—(lower)alkyl, is mixed with about 0.2 to 1 equimolar weight, but preferably about 1 equimolar weight, of 7-aminocephalosporanic acid in an inert solvent such as tetrahydrofuran, diethyl ether, tetrahydrofuran-water, or the like, at a temperature below 0° C., and preferably below —25° C., in the presence of a mild base, preferably a tertiary amine such as triethylamine, pyridine or the like to produce a compound having the formula

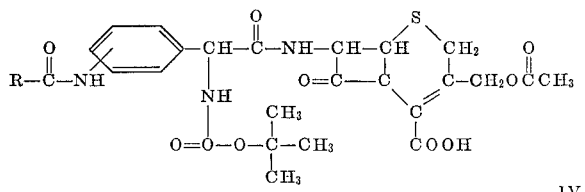

IV wherein R is (lower)alkyl.

The term "functional equivalent" as an acylating agent for a primary amine is further defined for the purpose of the present invention to include the corresponding acid halides, acid anhydrides, including other mixed anhydrides and particularly the mixed anhydrieds prepared from stronger acids such as the lower aliphatic monoesters of carbonic acid, of alkyl and aryl sulfonic acids and of more hindered acids such as diphenylacetic acid. In addition, an acid azide or an active ester or thioester (e.g. with p-nitrophenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6,360 (1965)] or by the use of enzymes or of an N,N'-carbonyldiimidazole or an N,N'-carbonyldi-triazole [cf. South African patent specification 63/2,684] of a carbodiimide reagent [especially N,N'-dicyclohexyl-carbodiimide, N,N'-diisopropylcarbodiimide or N-cyclohexyl-N'-(2-morpholinoethyl)-carbodiimide; [cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the anhydride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well known int he art (cf. U.S. Patents Nos. 3,079,314, 3,117,126 and 3,129,224 and British Patents Nos. 932,644, 957,570 and 959,054).

(2) The second step of the process comprises mixing the compound IV above with a concentrated aqueous solution of formic acid about 40% to 60%, or with concentrated trifluoroacetic acid at about —10° to 50° C., but preferably 0° to 25° C., for a time period varying between about 10 minutes and 6 hours depending on the reagent used, to produce a compound having the formula

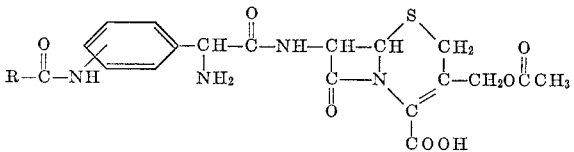

I wherein R is (lower)alkyl.

(3) The third step of the process comprises mixing a quantity of compound I with at least an equimolar weight of acetone in the absence of substantial amounts of water at a pH in the range of 5 to 9 and at a temperature in the range of —20° C. to +50° C. to produce a compound having the formula

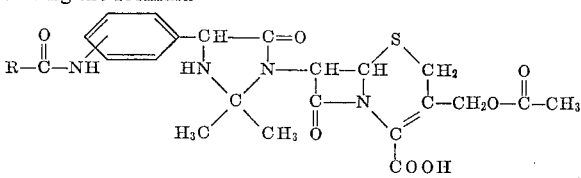

II

The compounds I and II of the present invention are useful in the treatment of infections caused by gram-positive and gram-negative bacteria such as *Diplococcus pneumoniae, Streptococcus pyogenes, Staphylococcus aureus* Smith, *Salomenella enteritidis, Salmonella typhosa, Klebsiella pneumoniae,* and others.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three or four times a day. They are administered in dosage units containing, for example 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

A preferred embodiment of the present invention is the compound having the formula

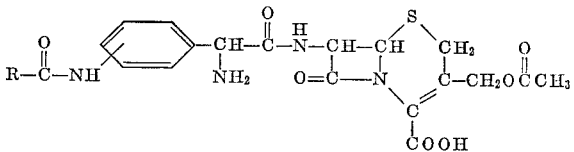

wherein R is (lower)alkyl; and the pharmaceutically acceptable nontoxic salts thereof.

Another preferred embodiment of the present invention is the compound having the formula

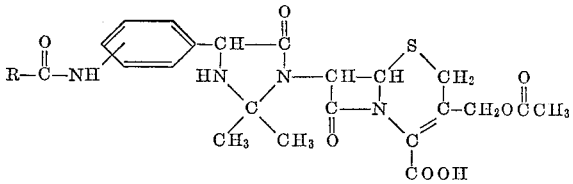

wherein R is (lower)alkyl; and the pharmaceutically acceptable salts thereof.

The most preferred embodiments of the present invention are the compounds as illustrated below:

(A)
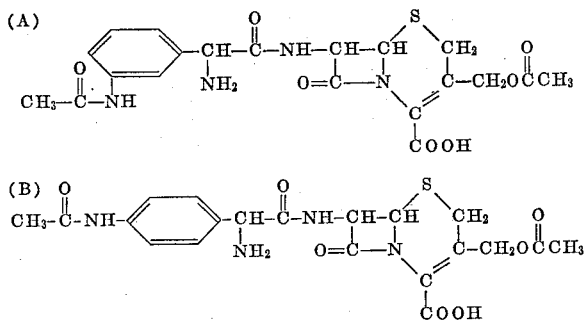

(B)
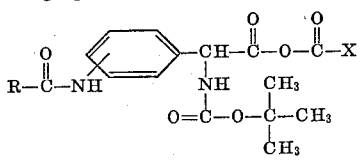

and the pharmaceutically acceptable salts thereof.

The acylating agents having the formula

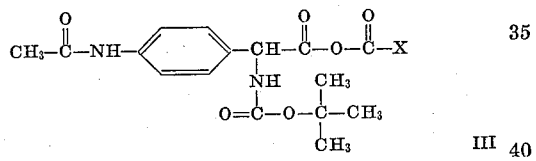
III wherein R is (lower) alkyl, are compounds used as intermediates in the preparation of the compounds of the present invention.

These compounds, and some of the intermediates of these compounds, and the processes for their preparation are new and heretofore unknown.

The process for the preparation of the compound having the formula

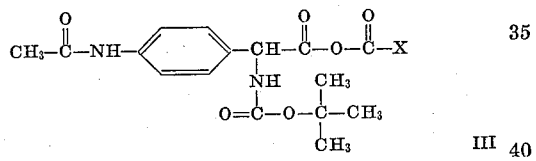
III comprises the consecutive steps of (a) Mixing D-(—)-2-phenylglycine with an excess of acetic anhydride or acetyl halide, preferably in about a 1:2 molar ratio, in the presence of a base such as an alkali metal hydroxide, in a non-reactive solvent or a slow-reactive solvent, preferably water, subsequently followed by acidification to produce a compound having the formula

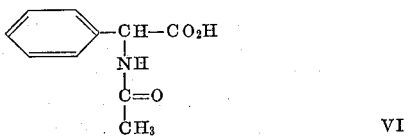
VI (b) Nitrating VI by dissolving it in concentrated sulfuric acid and nitric acid at temperatures about 0° C. to produce a compound having the formula

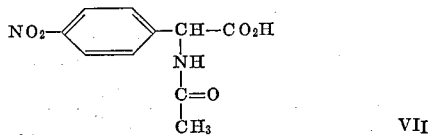
VII (c) Reducing the nitro compound by catalytic hydrogenation in an inert solvent such as an alcohol (ethanol, etc.), benzene, toluene, tetrahydrofuran, chloroform, or the like, but preferably ethanol, with a catalyst such as platinum oxide, palladium on charcoal, or the like, to produce a compound having the formula

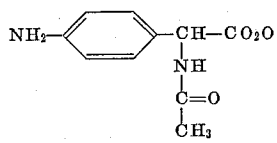
VIII (d) Hydrolyzing the above amino compound with an acid such as hydrochloric acid, preferably with the aid of heat, to produce a compound having the formula

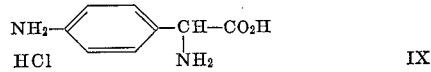
IX and (e) Selectively monoacylating the diamino compound by treatment with thioacetic acid at about pH 4–6 in aqueous solution to produce a product having the formula

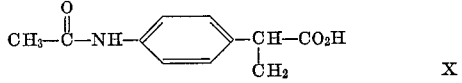
X which product is known as D-α-amino-4-acetamidophenylacetic acid.

Substitution in the procedure of step c of the above process for the D-α-acetamido-4-nitrophenylacetic acid used therein of D-α-amino-3-nitrophenylacetic acid produces D-α-amino-3-aminophenylacetic acid. Subsequent substitution in the procedure of step e of the above process for the D-α-amino-4-aminophenylacetic acid used therein of D-α-amino-3-aminophenylacetic acid produces D-α-amino-3-acetamidophenylacetic acid (XI).

D-α-amino-2-acetamidophenylacetic acid (XII) can be prepared by the procedures described in Examples XVIII through XXI.

The compounds having the formula

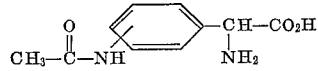

are further treated with an excess of t-butoxycarbonyl azide, preferably about a 10% molar excess, an excess of magnesium oxide, preferably about 100% molar excess, in an aqueous dioxane solution, preferably about 50% dioxane, to produce the corresponding product having the formula

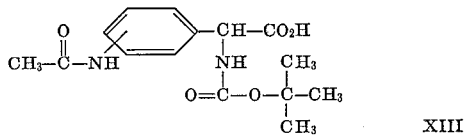
XIII

A compound of the Formula XIII is converted to a compound having the Formula III by the treatment of compound XIII with about an equimolar quantity of trichloroacetyl halide, preferably trichloroacetyl chloride, or about an equimolar quantity of ethyl chloroformate, in the presence of a base, preferably an equimolar quantity of triethylamine, to produce in situ the mixed anhydride III which is subsequently reacted with 7-aminocephalosporanic acid to produce a compound having the Formula IV. The functional equivalents of compound III for the acylation of a primary amine for the purpose of this disclosure include those previously described.

Preferred embodiments of the present invention are the compounds having the formulas

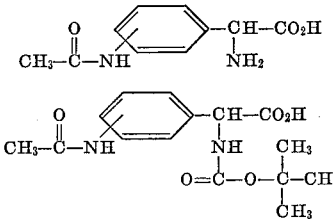

and

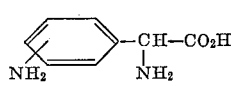

The following examples will serve to illustrate but not to limit the present invention.

DESCRIPTION OF THE PREFERRED EMBODIMENTS

Example I.—D-α-t-butoxycarboxamido-4-acetamido phenylacetic acid

A mixture of D-α-amino-4-acetamidophenylacetic acid (0.0205 mole), 3.2 g. (0.022 mole) of t-butoxycarbonyl azide, 1.65 g. (0.041 mole) of magnesium oxide and 100 ml. of 50% aqueous dioxane was stirred for 20 hours under a nitrogen atmosphere. The reaction mixture was poured into 400 ml. of ice water plus 300 ml. of ethyl acetate. The ethyl acetate phase was twice extracted with dilute aqueous sodium bicarbonate solution, the extracts being combined with the aqueous phase. The aqueous phase was acidified to pH 4 with 42% phosphoric acid and extracted with five 100-ml. portions of ethyl acetate. The combined and dried (sodium sulfate) ethyl acetate extract was stripped of solvent at reduced pressure. A solution of the residue in a minimum amount of chloroform was added to a large volume of "Skellysolve B" (petroleum solvent B.P. 60–68° C., essentially n-hexane) to yield 5.6 g. of D-α-t-butoxycarboxamido-4-acetamidophenylacetic acid as an amorphous solid. The infrared and nuclear magnetic resonance (NMR) spectra were consistent with the desired product.

Example II.—7-[D-α-amino-(4 - acetamidophenylacetamido)]-cephalosporanic acid A solution of 5.6 g. (0.0182 mole) of D-α-t-butoxycarboxamido-4-acetamidophenylacetic acid and 2.58 ml. (0.0182 mole) of triethylamine in 50 ml. of tetrahydrofuran was cooled to −45° C. (crystallization) and 2.04 ml. (0.0182 mole) of trichloroacetyl chloride was added dropwise during 5 minutes at −45° C. After stirring for 10 minutes a cold (−50°) filtered solution of 4.96 g. (0.0182 mole) of 7-aminocephalosporanic acid and 5.1 ml. (0.0364 mole) of triethylamine in 250 ml. of methylene chloride was added in one portion. The reaction mixture was stirred at −45° C. for one-half hour, then the cooling bath was removed and the temperature allowed to rise to 0°. The solvent was removed at reduced pressure. Water and ether were added to the residue. The ether phase was extracted once with aqueous sodium bicarbonate solution and the extract combined with the aqueous phase. The aqueous solution was acidified with 42% phosphoric acid and extracted twice with ethyl acetate. The combined ethyl acetate extracts were twice washed with water, dried over anhydrous sodium sulfate and the solvent removed at reduced pressure. Trituration of the residue gave a solid which has dissolved in chloroform. Crystalline 7-[D-α-t-butoxycarboxamido - (4 - acetamidophenylacetamido)]-cephalosporanic acid separated; weight 2.6 g.

7 - [D - α - t - butoxycarboxamido - (4 - acetamidophenylacetamido)]-cephalosporanic acid (2.45 g.) was added to 74 ml. of 45% aqueous formic acid and the solution was stirred at 40° for 3 hours. The water and formic acid were distilled off at reduced pressure, toluene finally being added and distilled off to remove any remaining water an formic acid. The residue was triturated with wet ethyl acetate, concentrated somewhat to remove water, finally more ethyl acetate was added giving a filterable solid. The solid was triturated with 95% ethanol yielding, after drying in vacuo over phosphorus pentoxide, 1.4 g. of 7-[D-α-amino-(4-acetamidophenylacetamido)]-cephalosporanic acid. The infrared and nuclear magnetic resonance spectra were consistent with the desired product.

Minimum Inhibitory Concentration (M.I.C.) against: *D. pneumoniae*+5% serum, 2.5 mcg./ml.; *S. pyogenes*, 0.16 mcg./ml.; *Sal. typhosa*, 3.1 mcg./ml.

Example III.—7 - (2,2 - dimethyl-5-oxo-4-(4′-acetamidophenyl) - 1 - imidazolidinyl)-3-acetoxymethyl-8-oxo-5-thia-1-azabicyclo-[4·2·0]oct2-ene-2-oic acid A mixture of 1.4 grams of 7-[D-α-amino-(4-acetamidophenyl-acetamido)] - cephalosporanic acid (containing 50% sodium chloride) and 0.3 ml. of triethylamine in 30 ml. of acetone is stoppered to the atmosphere and stirred for about 15 hours at 25° C. The insoluble sodium chloride is removed by filtration the solvent removed in vacuo at 35° C. The residue is evaporated again with about 30 ml. of dry ethyl acetate and rinsed from the flask with dry ether. The infrared spectra of the residue is characterized by intense bands (KBr) at about 2.95 (NH) 3.66, 3.75 and 4.02 (triethylammonium) 5.6–6.0 (β-lactam, acetamido, ester, imidazolidinone), 6.26 (carboxylate), and 7.12 (ester).

The above triethylamine salt is dissolved in water, layered with ethyl acetate and acidified to pH 2 with 42% phosphoric acid. The free acid is extracted into the ethylacetate and the water phase is re-extracted 2 times more with additional portions of ethyl acetate. The combined extracts are washed with water, dried over anhydrous sodium sulfate and concentrated. Crystallization is accomplished from light petroleum solvent, B.P. 60–70° C. and the solid product, 7-(2,2-dimethyl-5-oxo-4-(4′-acetamidophenyl) - 1-imidazolidinyl)-3-acetoxymethyl-8-oxo-5-thia-1-azabicyclo-[4·2·0]-oct-2-ene-2-oic acid, is collected by filtration. The antibacterial spectrum and potency (MIC's) of the compound is of a magnitude similar to that shown by the compound of Example II, 7-[D-α-amino-(4-acetamidophenylacetamido)]-cephalosporanic acid.

Example IV.—D-α-t-butoxycarboxamido-3-acetamidophenylacetic acid

D-α-amino-3-acetamidophenylacetic acid (6.9 g., 0.0331 mole), 2.67 g. (0.0662 mole) of magnesium oxide and 5.23 g. (0.0365 mole) of t-butoxycarbonyl azide were combined in 84 ml. of 50% aqueous dioxane. After 15 minutes of stirring, an additional 40 ml. of 50% aqueous dioxane was added. The mixture was stirred at 45 to 50° for 24 hours. The reaction mixture was poured into 400 ml. of cold water plus 300 ml. of ethyl acetate; the whole was then filtered to remove a small amount of insoluble material. The ethyl acetate phase was once extracted with dilute aqueous sodium bicarbonate and this combined with the aqueous phase. The cold aqueous solution was adjusted to pH 4 with 42% phosphoric acid and extracted with ethyl acetate. The ethyl acetate extract was washed three times with water, dried with anhydrous sodium sulfate and stripped of solvent at reduced pressure. The residue was dissolved in anhydrous ether and diluted with "Skellysole B" giving 5.9 g. of D-α-t-butoxycarboxamido-3-acetamidophenylacetic acid as an amorphous solid. The infrared and nuclear magnetic resonance spectra was consistent with the desired product.

Example V.—7-[D-α-t-butoxycarboxamido-(3-acetamidophenylacetamido)]-cephalosporanic acid A cold (0 to 5° C.) solution of 4.86 g. (0.0178 mole) of 7-aminocephalosporanic acid and 2.5 ml. (0.0178 mole) of triethylamine in 25 ml. of water plus 25 ml. of tetrahydrofuran was added in one portion to the vigorously stirred mixed anhydride prepared from 5.5 g. (0.0178 mole) of D-α-t-butoxycarboxamido-3 - acetamidophenylacetic acid, 2.5 ml. (0.0178 mole) of triethylamine and 1.7 ml. (0.018 mole) of ethyl chloroformate in 75 ml. of tetrahydrofuran at −8 to −10° C. The mixture was stirred at about −8° C. for 50 minutes then the cooling bath was removed and the mixture was stirred for 10 minutes. An additional 30 ml. of water was added. Most of the tetrahydrofuran was removed at reduced pressure. The aqueous concentrate was extracted three times with ethyl acetate, the ethyl acetate extracts being discarded. The aqueous phase was acidified with 42% phosphoric acid and extracted three times with ethyl acetate. A small amount of insoluble material was removed by filtration during the first extraction. The combined ethyl acetate extracts were dried with anhydrous sodium sulfate, the solvent removed at reduced pressure and the residue triturated with anhydrous ether giving 6.2 g. of 7-[D-α-t- butoxycarboxamido - (3 - acetamidophenylacetamido)]-cephalosporanic acid as an amorphous solid. The infrared and nuclear magnetic resonance spectra were consistent with the desired product.

Example VI.—7-[D-α-amino(3-acetamidophenylacetamido)]-cephalosporanic acid

Six g. of 7-[D-α-t-butoxycarboxamido(3 - acetamidophenylacetamido)]-cephalosporanic acid was added to 180 ml. of 44% aqueous formic acid. At first a solution was obtained and then a crystalline solid separated accompanied by gas evolution. The reaction mixture was stirred at 39 to 40° for 3 hours. The crystalline solid was filtered from the cooled reaction mixture and identified as 7 - [D-α-t-butoxycarboxamido(3-acetamidophenylacetamido)]-cephalosporanic acid, weight 2.1 g. having the following analysis (values corrected for 4.59% water): C, 53.6; H, 5.17; N, 10.08. Calcd. for $C_{25}H_{30}N_4O_9S$: C, 53.4; H, 5.38; N, 9.96.

The solvent was evaporated from the filtrate at reduced pressure. Toluene was added to the residue and this evaporated at reduced pressure to completely remove water and formic acid. This was repeated three times. The residue was triturated with wet ethyl acetate and then with anhydrous ether giving crude 7-[D-α-amino(3-acetamidophenylacetamido)]-cephalosporanic acid as a filterable solid; weight 3.8 g. This crude product (3.5 g.) was combined with a two-phase system of water and ethyl acetate, a small amount of dark colored impurity being removed by filtration. The filtrate was concentrated to a small volume at reduced pressure. The aqueous concentrate deposited a small amount of crystalline impurity which was removed by filtration. The aqueous filtrate was concentrated to dryness, the residue triturated with anhydrous ether and collected by filtration giving 1.6 g. of 7 - [D - α - amino(3 - acetamidophenylacetamido)]-cephalosporanic acid. The infrared and nuclear magnetic resonance spectra were consistent with the desired product.

M.I.C.'s against: *D. pneumoniae*+5% serum, 0.62 mcg./ml.; *St. pyogenes*, 0.16 mcg./ml.; *Sal. typhosa*, 3.1 mcg./ml.; *E. coli* Juhl, 6.2 mcg./ml.; *S. aureus* Smith +50% serum, 3.1 mcg./ml.

Example VII.—7-[2,2-dimethyl - 5 - oxo-4-(3'-acetamidophenyl) - 1 - imidazolidinyl]-3-actoxymethyl-8-oxo-5-thia-1-azabicyclo-[4.2.0]oct-2-ene-2-oic acid Substitution in the procedure of Example III for the 7-[D-α-amino-(4 - acetamidophenylacetamido)] - cephalosporanic acid used therein of 7-[D-α-amino-(3-acetamidophenylacetamido)]-cephalosporanic acid produces 7-[2,2-dimethyl-5-oxo-4-(3'-acetamidophenyl) - 1 - imidazolidinyl]-3-acetoxymethyl - 8 - oxo - 5-thia-1-azabicyclo-[4.2.0] oct-2-ene-2-oic acid.

Example VIII. — D-α-t-butoxycarboxamido-2-acetamidophenylacetic acid

Substitution in the procedure of Example 1 for the D-α-amino-4-acetamidophenylacetic acid used therein of D-α-amino-2-acetamidophenylacetic acid produces D-α-t-butoxycarboxamido-2-acetamidophenylacetic acid.

Example IX.—7-[D-α-amino(2-acetamidophenylacetamido)]-cephalosporanic acid

Substitution in the procedure of Example II for the D-α-t - butoxycarboxamido-4-acetamidophenylacetic acid used therein of D-α-t-butoxycarboxamido-2-acetamidophenylacetic acid produces 7-[D-α-amino-(2-acetamidophenylacetamido)]-cephalosporanic acid.

Example X.—7 - [2,2 - dimethyl-5-oxo-4-(2'-acetamidophenyl - 1 - imidazolindinyl]-3-acetoxymethyl-8-oxo-5-thia-1-azabicyclo-[4.2.0]oct-2-ene-2-oic acid Substitution in the procedure of Example III for the 7-[D-α-amino-(4 - acetamidophenylacetamido)] - cephalosporanic acid used therein of 7-[D-α-amino-(2-acetamido-phenylacetamido)]-cephalosporanic acid produces 7-[2,2-dimethyl-5-oxo-4-(2'-acetamidophenyl) - 1 - imidazolidinyl]-3 - acetoxymethyl-8 - oxo - 5 - thia-1-azabicyclo-[4.2.0]oct-2-ene-2-oic acid.

Example XI.—D-α-acetamido-phenylacetic acid

A suspension of 50 g. (0.331 mole) of D-(-)-2-phenylglycine in 700 ml. of water was cooled to 0 to 5° C. and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a mixamum of about 25° C. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188° C., $[\alpha]_D^{24°}=-217.9°$ (C. 1%, EtOH).

Example XII.—D-α-acetamido-4-nitrophenylacetic acid

D-α-acetamido-phenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, d =1.5, 9.7 ml., 0.208 mole) was added dropwise at such a rate to the stirred mixture that the salt-ice cooling bath maintained the temperature in the range 0 to −5° C. The reaction mixture was stirred at −5 to −10° C. for an additional 30 minutes and the poured onto about 300 g. of ice flakes. The white crystalline product was collected by filtration, washed with water and recrystallized three times from 1:1 95% ethanol-water; M.P 180–182° C. dec., yield 11.5 g. (46.4%). An additional recrystallization from ethyl acetate did not change the melting point; $[\alpha]_D^{24°}=-206.4°$ (C. 0.5% EtOH).

*Analysis.*—Calc'd for $C_{10}H_{10}N_2O_5$: C, 50.42; H, 4.23; N, 11.76. Found: C, 50.14; H, 4.07; N, 11.96.

Example XIII.—D-α-acetamido-4-aminophenylacetic acid

A solution of 15 g. (0.063 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water; weight 4.8 g., M.P. 207–209° C. dec., $[\alpha]_D^{24°}=-182.2$ (C. 0.5% 1 N HCl).

*Analysis.*—Calc'd for $C_{10}H_{12}N_2O_3$: C, 57.71; H, 5.81; N, 13.46. Found: C, 57.61, 57.64; H, 5.67; N, 13.18.

Example XIV.—D-α-amino-4-acetamidophenylactic acid

D-α-acetamido-4 - aminophenylacetic acid (39.2 g., 0.188 mole) in 400 ml. of 2 N hydrochloric acid was refluxed for 2 hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-α-amino-4-aminophenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml of thioacetic acid. The mixture was stirred for 17 hours at 24° C. under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20% NaOH, heated to 90°, decolorized with carbon, and the product allowed to crystallize in the cold overnight. The resulting gelatinous mass was broken up by warming. The solid was removed by filtration; weight 0.2 g., M.P. 203–206° C. dec. The filtrate was diluted with an equal volume of 95% ethanol giving 1.4 g. of D-α-amino - 4 - acetamidophenylacetic acid; M.P. 214–215 C. dec., $[\alpha]_D^{24°}=-133.4°$ (C 0.5 1 N HCl).

Analysis.—Calc'd for $C_{10}H_{12}N_2O_3$: C, 57.71; H, 5.81; N, 13.46. Found: C, 56.80, 56.72; H, 5.84, 5.89; N, 13.62; Karl Fisher—$H_2O$, 1.32. Found values corrected for 1.32% water; C, 57.52; H, 5.71; N, 13.80.

Example XV.—D-α-amino-3-aminophenylacetic acid

A solution of 9.8 g. (0.05 mole) of D-α-amino - 3-nitrophenylacetic acid [P. Friis and A. Kjaer, Acta Chimica Scand. 17, 2391 (1963); British patent specification, 1,033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30° C. After 1 hour additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurring with 95% ethanol. After drying in a vacuum oven for 3 hours at 40° C. and then in vacuo over phosphorus pentoxide for 64 hours there was obtained 25.7 g. of D-α-amino-3-aminophenylacetic acid; M.P. 188–191° C., $[\alpha]_D^{24°}=-139.0$ (C. 1 in HCl).

Example XVI.—D-α-amino-3-acetamidophenylacetic acid

A mixture of 5 g. (0.0301 mole) of D-α-amino-3-aminophenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate, the product started to crystallize. The concentrate was diluted with 95% ethanol and, after chilling in an ice bath, the product was filtered and washed with 95% ethanol; weight 1.8 g. The filtrate was further diluted with 95% ethanol giving an additional 2.3 g. of product. The two crops of product were combined, dissolved in a small amount of water by warming, the solution concentrated slightly and diluted with a large volume of 95% ethanol. The initial crop of solid was removed by filtration and the filtrate stored in the cold for 16 hours giving, after drying at 65° C. for 3 hours in vacuo over phosphorus pentoxide, 0.90 g. of product, M.P. 185–187° C. dec. The product was twice recrystallized from 1:1 95% ethanol-water; weight 0.36 g., M.P. 186–187° C. dec., $[\alpha]_D^{24°}=-120°$ (C. 0.5 −1 N HCl).

Analysis.—Calc'd for $C_{10}H_{12}N_2O_3$: C, 57.7; H, 5.81; N, 13.5. Found: C, 47.29; H, 6.79; N, 11.21; $H_2O$, 18.3. Found values corrected for 18.3% water: C, 57.9; H, 5.83; N, 13.7.

Example XVII.—7 - [D - α - amino(3 - acetamidophenylacetamido)] cephalosporanic acid monohydrate. Crystalline sample Crystalline 7 -[D - α - t - butoxycarboxamido (3 - acetamidophenyl - acetamido)] - cephalosporanic acid 1.64 g.) was added to 16 ml. of cold (ice bath) trifluoroacetic acid. The solution was stored at 10 to 15° for 15 minutes with frequent swirling and then poured into 225 ml. of cold anhydrous ether. The precipitate was collected by filtration and washed with anhydrous ether. The solid was added to a mixture of 100 ml. of water and 25 ml. of a 25% solution of Aberlite LA–1 resin (acetate form) in methyl isobutyl ketone and the mixture stirred at room temperature (24°) for 2 hours. The aqueous phase was washed 3 times with methyl iso-butyl ketone and concentrated to a small volume giving a crystalline product. Fresh methyl iso-butyl ketone was added and the crystallization allowed to proceed for 1 hour. The product was filtered and washed with methyl iso-butyl ketone giving, after drying in vacuo over phosphorus pentoxide, 0.95 g. of crystalline 7-[D-α-amino-(3 - acetamidophenylacetamido)] - cephalosporanic acid monohydrate. The infrared and nuclear magnetic resonance spectra were consistent with the desired product.

Analysis.—Calc'd for $C_{20}H_{22}N_4O_7S \cdot H_2O$: C, 49.99; H, 5.03; N, 11.66. Found: C, 49.66; H, 5.32; N, 11.60.

Example XVIII.—D-α-amino-2-nitrophenylacetic acid

Seventy-five grams of 2-nitrophenylacetic, acid is treated with 100 grams of thionyl chloride, at 60° C. followed by the addition of 23 ml. of bromine in the presence of ultraviolet light to yield α-bromo-2-nitrophenylglycine. The product is purified by vacuum distillation. The resultant α-bromo acid chloride is decomposed to the carboxylic acid by water, followed by crystallization to produce purified α-bromo-2-nitrophenylacetic acid.

The α-bromo-2-nitrophenylacetic acid is dissolved in liquid ammonia or 12% ammonia for up to 24 hours.

The ammonia is evaporated in vacuo and the resultant residue is adjusted to pH 4-5 with hydrochloric acid. The product is collected by filtration or extraction, purified by crystallization, and resolved into the d and l forms, i.e., d- or l-α-amino-2-nitrophenylacetic acid by methods described in the chemical literature. Bette & Meyer, Ber. 41, 2073 (1908); Ingersoll & Adams, J. Am. Chem. Soc., 47, 1168 (1925); Kuna, Ovakirinan and Levene, J. Biol, Chem. 137, 334 (1941). The above procedure is comparable to that described in K. Heyns and H. Schultz, Ann. 611, 40 (1958).

Example XIX.—D-α-acetamido-2-nitrophenylacetic acid

A suspension of 1 mole of D-α-amino-2-nitrophenylacetic acid in 1 liter of water is cooled to about 0° C. and 1 mole of sodium hydroxide is added to produce a solution. Acetic anhydride, 2 moles, is added in one portion to the vigorously stirre solution which is cooled to 0°–5° C. by means of a salt-ice bath. An immediate addition of 3 moles of sodium hydroxide in aqueous solution is made by dropping funnel. The temperature is allowed to rise to about 25° C. The solution is stirred about fifteen minutes and then cautiously acidified with concentrated hydrochloric acid. The precipitated product is collected by filtration, washed with water, and recrystallized from 1:1 95% ethanol-water to produce D-α-acetamido-2-nitrophenylacetic acid.

Example XX.—D-α-acetamido-2-aminophenylacetic acid

Substitution in the procedure of Example XIII for the D-α-acetamido-4-nitrophenylacetic acid used therein of D-α-acetamido-2-nitrophenylacetic acid produces D-α-acetamido-2-aminophenylacetic acid.

Example XXI.—D-α-amino-2-acetamidophenylacetic acid

Substitution in the procedure of Example XIV for the D-α-acetamido-4-aminophenylacetic acid used therein of D-α-acetamido-2-aminophenylacetic acid produces D-α-amino-2-acetamidophenylacetic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The compounds having the formula

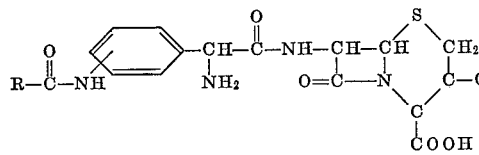

wherein R is (lower) alkyl; and the pharmaceutically acceptable, nontoxic salts thereof.

2. A compound of claim 1 having the formula

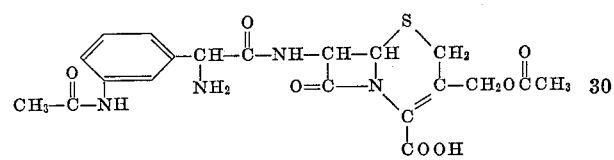

and the pharmaceutically acceptable, nontoxic salts thereof.

3. A compound of claim 1 having the formula

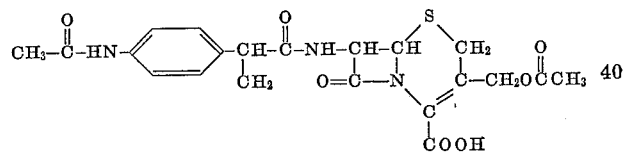

and the pharmaceutically acceptable, nontoxic salts thereof.

4. A compound of claim 1 having the formula

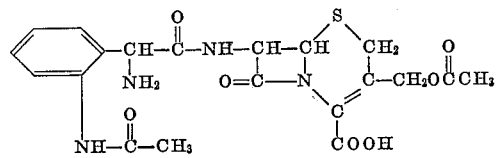

and the pharmaceutically acceptable, nontoxic salts thereof.

5. A compound having the formula

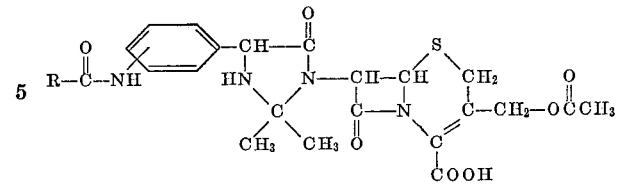

wherein R is (lower)alkyl; and the pharmaceutically acceptable, nontoxic salts thereof.

6. A compound of claim 5 having the formula

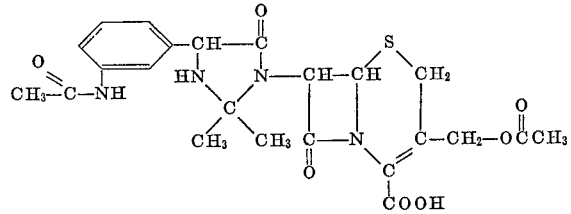

and the pharmaceutically acceptable, nontoxic salts thereof.

7. A compound of claim 5 having the formula

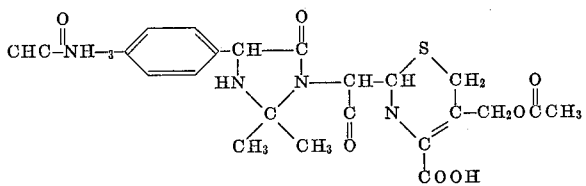

and the pharmaceutically acceptable, nontoxic salts thereof

8. A compound of claim 5 having the formula

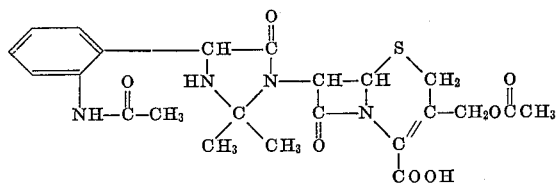

and the pharmaceutically acceptable, nontoxic salts thereof.

References Cited

UNITED STATES PATENTS 3,311,621   3/1967   Crast et al. _____ 260—239.1

NICHOLAS S. RIZZO, Primary Examiner

U.S. Cl. X.R.

260—999

UNITED STATES PATENT OFFICE
CERTIFICATE OF CORRECTION

Patent No. 3,464,985                     September 2, 1969

Charles Truman Holdrege

It is certified that error appears in the above identified patent and that said Letters Patent are hereby corrected as shown below:

Column 13, lines 16 to 23, the formula should appear as shown below:

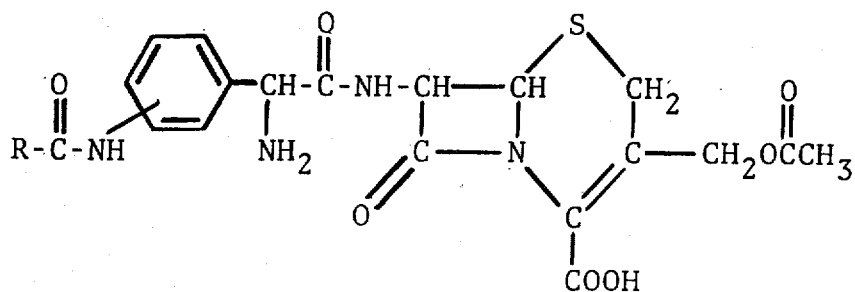

Same column 13, lines 37 to 43, the formula should appear as shown below:

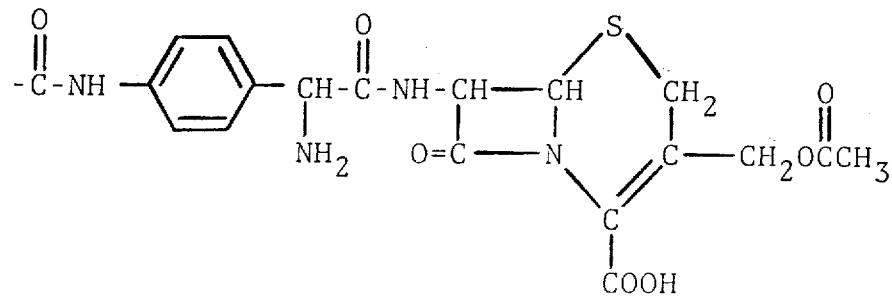

Column 14, lines 25 to 33, the formula should appear as shown below:

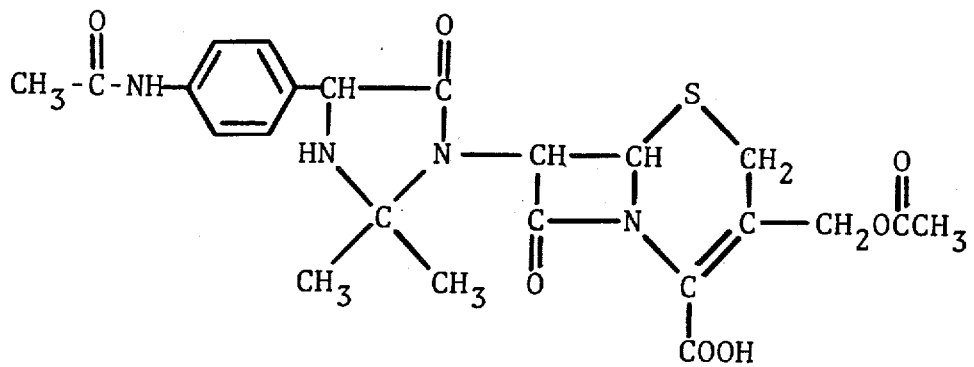

Signed and sealed this 16th day of June 1970.

(SEAL)
Attest:

EDWARD M. FLETCHER, JR.
Attesting Officer

WILLIAM E. SCHUYLER, JR.
Commissioner of Patents